Aug. 30, 1927.

R. W. DENSLOW 1,641,127

SANITARY CASTER

Filed Dec. 3, 1924

Inventor
Ruth W. Denslow
By Roland J. Whitaker
her Attorney

Patented Aug. 30, 1927.

1,641,127

UNITED STATES PATENT OFFICE.

RUTH W. DENSLOW, OF HOUSTON, TEXAS, ASSIGNOR OF ONE-HALF TO ROBERT L. COLE, OF HOUSTON, TEXAS.

SANITARY CASTER.

Application filed December 3, 1924. Serial No. 753,595.

An object of the invention is the provision of a caster for various kinds of furniture which will prevent insects from climbing onto the furniture.

Another object is to provide a sanitary guard in the form of a caster to keep bugs and the like from coming near the caster.

Still another object of my invention is to provide a sanitary caster which is inexpensive, durable and insect proof.

Other objects and advantages of my invention will be apparent from a reading of the following specifications and distinctly pointed out in the appended claim.

In a drawing to illustrate the invention Figure 1 is an elevation of the caster shown mounted in a wood member shown in cross section.

The same reference number refers to the same part through the several views.

Figure 1:
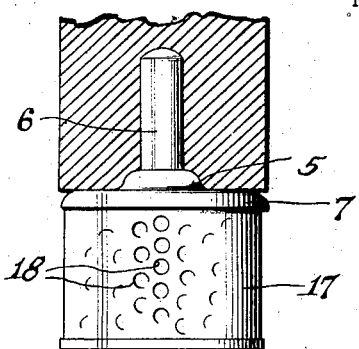

Numeral 5 designates a top member having a standard or shank 6, a flange 7 and cylindrical wall 8. Bottom member 9 has an outer flange 10, inner flange 11 and cylindrical wall 12. The cylindrical walls 8 and 12 are screw-threaded as shown at 13 to connect as clearly shown in Fig. 2 and form a cage.

Figure 2:
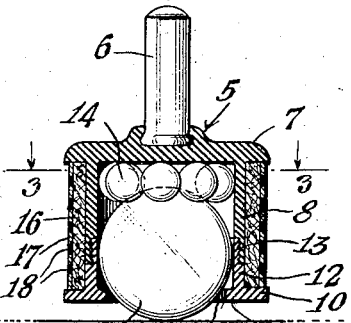
Fig. 2 is a vertical cross sectional view.
Figure 3:
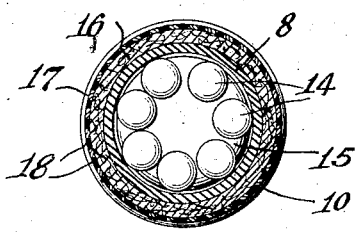
Fig. 3 is a horizontal sectional view on line 3—3 of Fig. 2.
Figure 4:
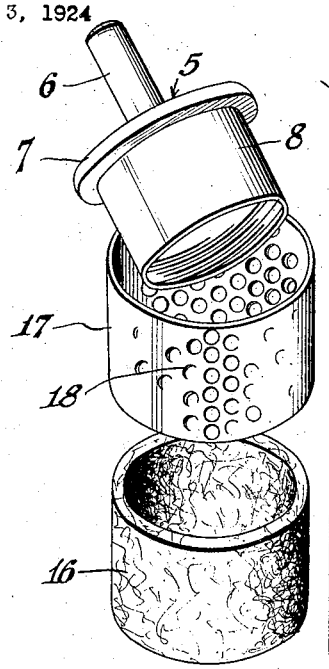
Fig. 4 is a perspective view of each of the disassembled parts of the caster.
Figure 4:
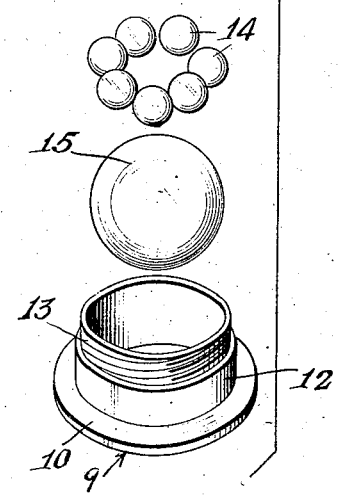

A plurality of small ball bearings 14 and a larger ball or sphere 15, assembled within the cage as in Fig. 2, function in the usual manner.

Around members 5 and 9 and held by flanges 7 and 10, I place a cylindrical absorbent member 16 which has first been impregnated with a suitable insecticide or germicide and around this insecticidic pad 16 is a cylindrical sheath 17 having perforations 18.

In operation the standard 6 of the assembled caster is slipped in the recess or hole of a leg of furniture (tables, desks, kitchen cabinets, beds etc.). Insects will not attempt to pass by the caster onto the furniture because of the odor, offensive to bugs, which constantly issues from pad 16 through perforations 18.

If desired the caster can be reimpregnated with the insecticide and because of the ease of assembly any worn part may be easily replaced.

I do not limit myself to any specific form of caster construction and it is clear that only a preferred embodiment of my invention is herein shown and described and any departure from the same, such as in shape, size or arrangement of parts may be resorted to without departing from the spirit of the invention or from the spirit or scope of the subjoined claim.

Having thus described my invention what I claim is:

In a caster, the combination of a floor engaging element, mating cylindrical members secured together end to end to form a cage operatively confining said element therein, said members being provided externally with annular flanges, a cylindrical insecticide pad surrounding said cage and confined between said flanges, and a cylindrical perforated sheath confined between said flanges to surround said pad.

RUTH W. DENSLOW.